Aug. 30, 1938.　　　F. B. HATEBUR　　　2,128,705
APPARATUS AND PROCESS FOR THE MANUFACTURE OF HOLLOW BODIES
Filed May 26, 1936　　　6 Sheets-Sheet 2
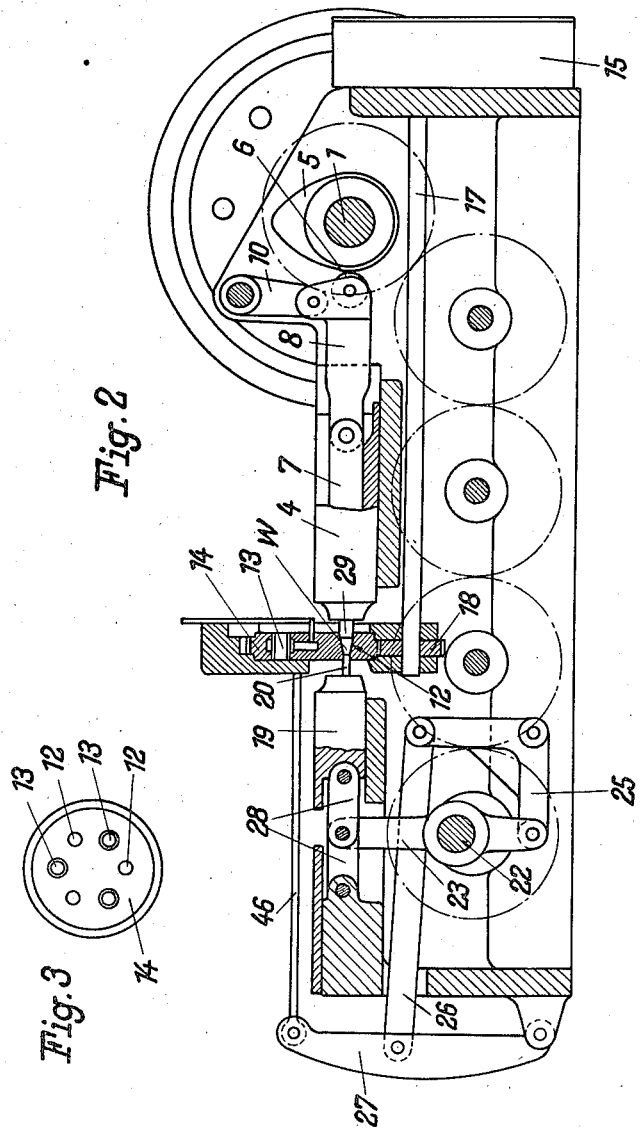
Inventor:
F. B. Hatebur

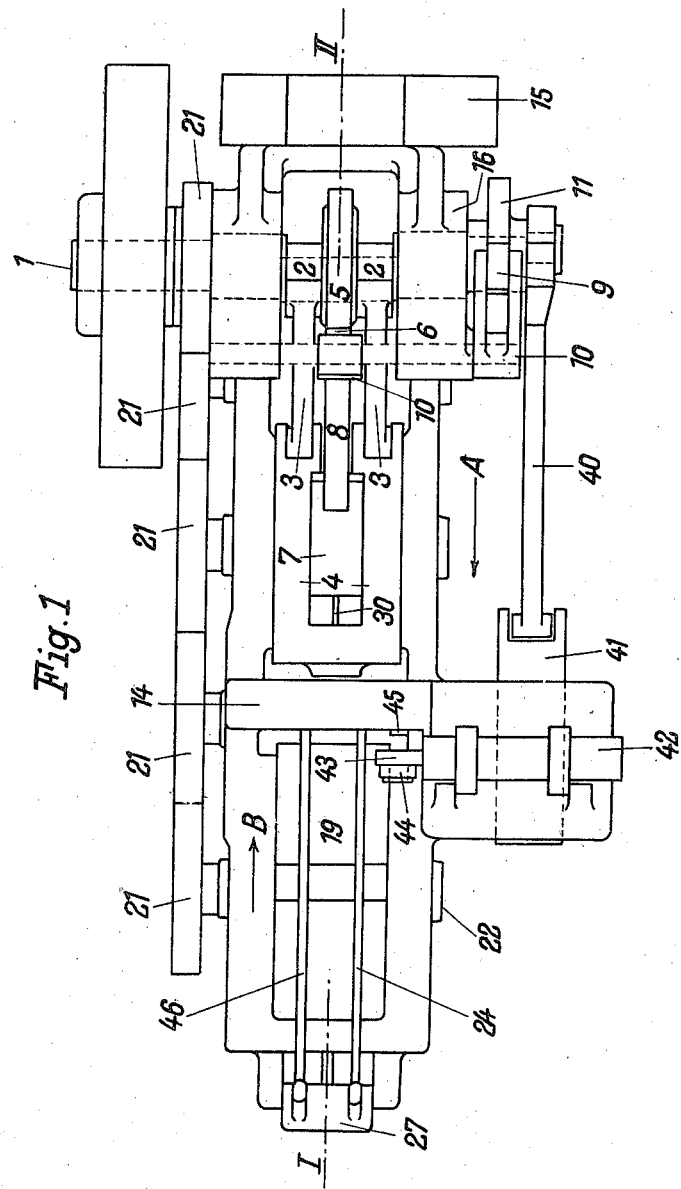

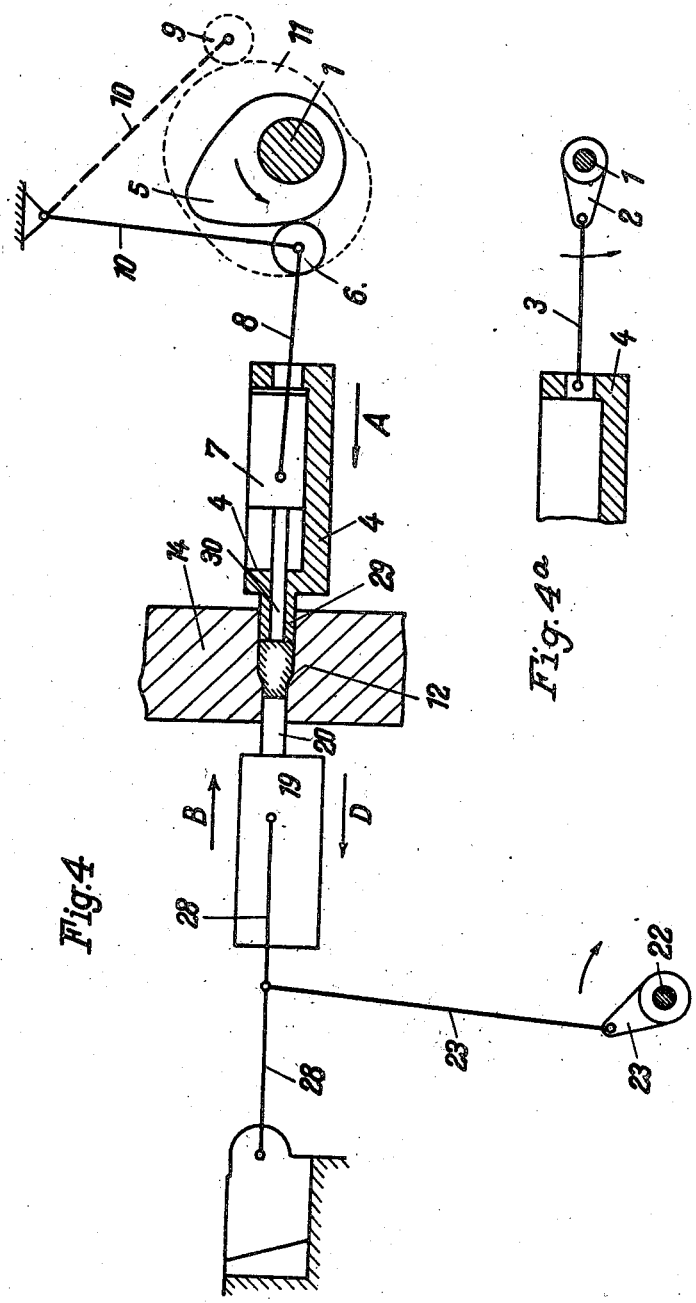

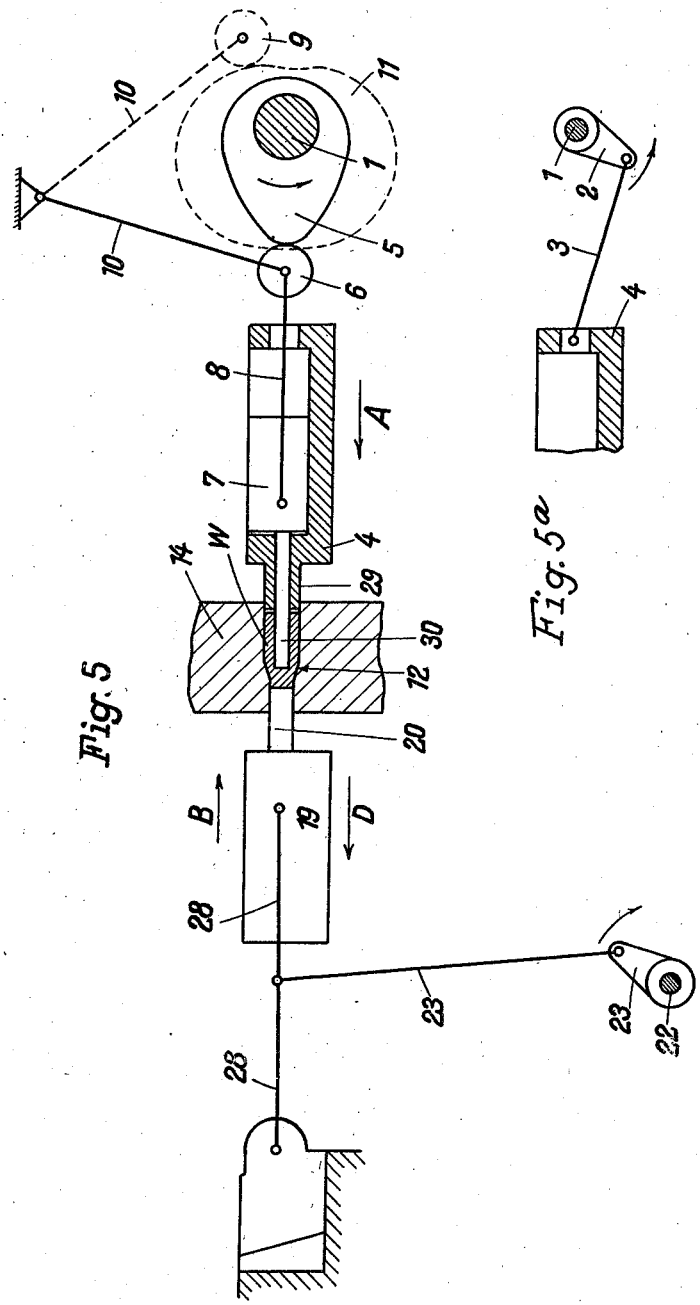

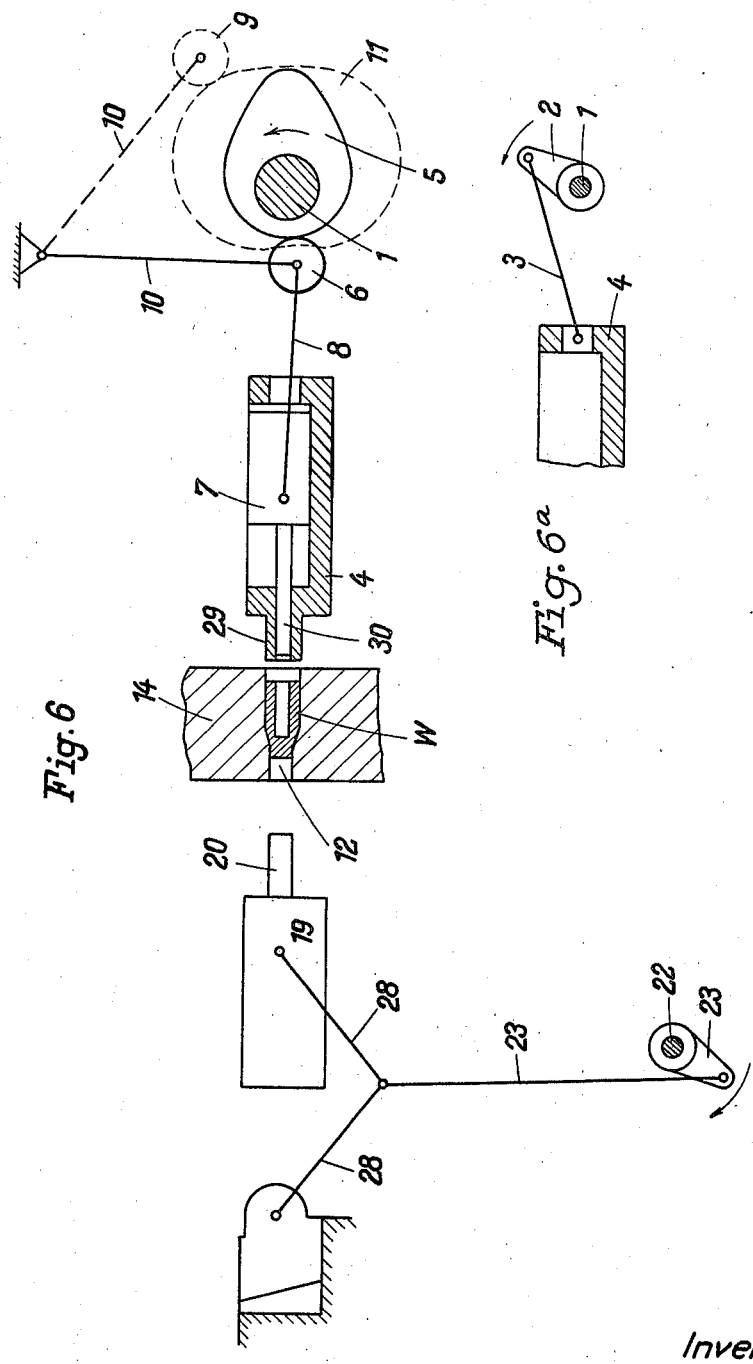

Patented Aug. 30, 1938

2,128,705

UNITED STATES PATENT OFFICE 2,128,705

APPARATUS AND PROCESS FOR THE MANUFACTURE OF HOLLOW BODIES

Fritz Bernhard Hatebur, Basel, Switzerland

Application May 26, 1936, Serial No. 81,852
In Germany March 12, 1935

9 Claims. (Cl. 78—9)

The present invention relates to process and apparatus for the manufacture of hollow bodies, particularly cylindrical hollow bodies closed at one end, such as for example pipe caps, steel cylinder caps, cap nuts, and the like, which have up to the present time been made by hot-pressing the required hollow body in several stages, or by first partly pressing it and then drawing it. Such processes waste time.

In accordance with the present invention the hollow body is hot-pressed from the bar in one and the same matrix during one revolution of the main shaft of the machine, various tools working on it in succession in the same matrix, these tools first giving the bar clean, smooth faces, then pressing it into a cylindrical hollow form during the partial back stroke of an annular die, and finally ejecting it.

By this method it is possible to obtain with the required precision greater hollow length with one press stroke of the machine than was formerly the case. In addition there is a saving in heat and less wear on the tools as compared with known processes, as the hollow body is formed in one and the same matrix without moving it out of place. There is the further advantage that in the making of long hollow bodies which, in consequence of their great length, lengthened by drawing once or several times, it is possible to start with a bar, for example a cylindrical one, of the smallest diameter that the long, finished hollow body is to have, whereas in known processes it is necessary to start with a shorter bar, for example one in the shape of a flower-pot, with a larger diameter than the finished body, for the purpose of pressing out the desired hollow form. According to the present invention it is possible to start with thinner bars, which are easier to handle and more quickly heated.

In order to carry this process into practical effect, use is made of a machine that is depicted by way of example in the accompanying drawings.

Fig. 1 shows a horizontal section through the machine.

Fig. 2 is a vertical section of the machine through the line I—II of Fig. 1.

Fig. 3 shows in detail a revolver or bed containing the matrices in which the pressing operations take place.

Figs. 4, 5 and 6 show schematically three essential working positions in the matrix with the corresponding tools and their drives. The Figures 4a, 5a and 6a represent different positions of slide 4.

Figure 7:
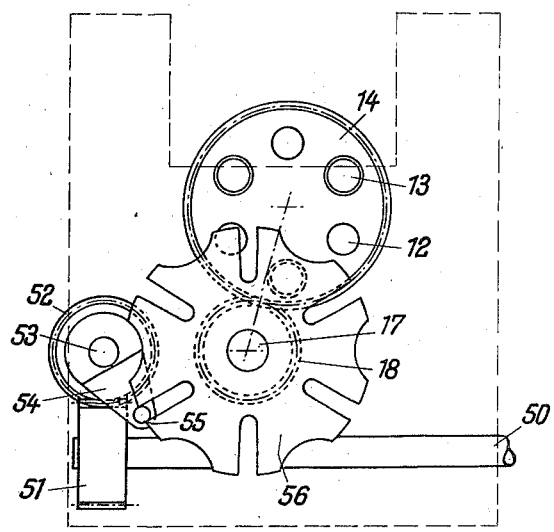
Figure 8:
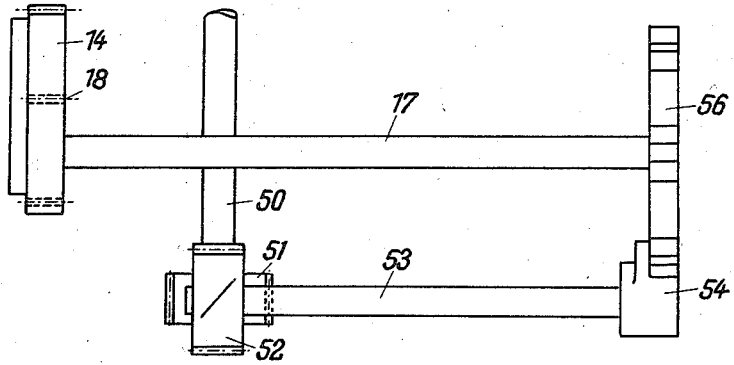

Figs. 7 and 8 represent an end view and a plan view, respectively, of a Geneva movement incorporated in the machine.

The main shaft 1 of the machine is driven in a known way. On the main shaft 1 are secured two cranks 2, which drive a main carriage 4 by means of the connecting rods 3. Between the cranks 2 there is secured to the main shaft 1 an edge cam 5 which, with the aid of a roller 6, acts on a rod 8 hinged to an inner carriage 7 and moves this inner carriage 7 in the direction of the press stroke (arrow A). The roller 6 is fastened to one end of a rigid two-armed lever 10. At the end of the second arm of this lever 10 is fastened a roller 9 which, with the aid of an edge cam 11, effects the automatic return of the inner carriage 7.

The die holder 14 contains on the same pitch circle three press matrices 12 and three cooling matrices interpolated between the press matrices and is mounted in the middle of the machine, and made for example in the form of a revolving plate. This die holder 14 is actuated intermittently by mechanism consisting of a Geneva gear mounted in the housing 15. According to Figures 3, 7 and 8, the outer rim of the die holder 14 is provided with gear teeth which mesh the teeth of a pinion 18. The latter is keyed to a rotatable shaft 17 which extends into the housing 15. The end of shaft 17 inside of the housing 15 has keyed to it a Geneva gear which is periodically engaged by a crank 54 keyed to a shaft 53. The shaft 53 is driven through helical gears 51 and 52 and through shaft 15 from the main shaft 1 by conventional means not shown in the drawings.

On the rear side of the die holder 14 a rear carriage 19 is mounted, which carries a press-die 20, which acts as an anvil piece. The drive of this rear carriage 19 is effected from the main shaft 1 through the gears 21 by means of a shaft 22 and a crank 23 mounted on this shaft, which crank acts on a knee joint 28.

The shaft 22 operates an inserting device 24 and an ejector 46 with the aid of a bell-crank lever 25, a rod 26 and a lever 27. For the pressing of material of smaller diameters an automatic cutter can be fitted to the machine. By means of a gear wheel 21 there is obtained in the body of the machine a 1:2 transmission gear, which is not shown, and which drives the one connecting rod 40 which operates a carriage 41, and in a known way operates a cross-carriage 42 by means of knee joints. On this cross-carriage 42 is a knife 43 which moves with this carriage and slides past a fixed circular cutter 44. As this movement is made only with every second stroke, the piece of material to be pressed is cut off from the bar in a known way only with every second stroke. A stop 45 limits the length of the piece cut off.

The part of the main carriage 4 facing the die holder 14 is in the form of an annular die 29. The inner carriage 7, which is mounted inside the main carriage 4, is fitted with a mandrel die 30 on the side facing the die holder 14.

The method of working is as follows:—

After a piece has been cut off a bar, which may be round or polygonal in section, and inserted in a matrix 12, there next follows the pressing process depicted schematically in Fig. 4.

The rear carriage 19 has pressed the press-die 20 in the direction of the arrow B against the piece W that is being worked on. At the time the main carriage 4 moves forward in the direction of the arrow A, so that the annular die 29 mounted on the main carriage 4 presses against the right-hand face of the piece W. The inner carriage 7 mounted inside the main carriage 4 at the same time assumes such a position that the mandrel 30 mounted on this inner carriage assumes the position shown in Fig. 4. In this position of the parts shown in Fig. 4 the piece W is pressed in such a way that the material, the shape of which always suffers to some extent when the piece is cut from the bar, is pressed smooth on both faces in the mould 12 between the dies 20, 29 and 30, and completely fills out the mould 12.

When the main shaft 1 turns further, the parts assume the position shown in Fig. 5. The main carriage 4 has been drawn back a little with its annular die 29 as the result of the sine movement of the crank 2 (in the direction of the arrow B). The cam 5 has pushed the inner carriage 7 further forward in the direction of the arrow A by means of the roller 6. The die 20 of the rear carriage 19 has remained in its former position. The mandrel 30 mounted on the inner carriage 7 now forms the internal hollowing in the solid piece W, so that the latter assumes the cylindrical hollow form closed at one end which is shown in Fig. 5. The hollowing W can form in the longitudinal direction without hindrance, as the crank 2 has withdrawn the main carriage 4 and with it the annular die 29.

On the further rotation of the main shaft 1 of the machine, the parts assume the positions shown in Fig. 6. The rear carriage 19 returns quickly in the direction of the arrow D, so that the die 20 is withdrawn from the matrix 12. At the same time the main carriage 4 also returns further in the direction of the arrow B, and with it returns the inner carriage 7 with the mandrel 30. The hollow piece W is now released in the matrix 12, the die holder 14 is brought out of line with the press-tools 20, 29 and 30 and the hollow body W is ejected by the ejector 46. The processes described so far take place during one revolution of the main shaft 1. During the next revolution of the main shaft the press-tools 20, 29 and 30 enter the next matrix 13, in which there is a cooling receptacle, so that during the second rotation of the main shaft 1 the press-tools are effectively cooled in the matrix 13 by a cooling fluid.

The cooling fluid is fed through a connection (not shown) in the center of one side of the die holder 14, and runs off through the holes provided in the matrices 13.

Therefore, in the machine described only every second stroke is a working stroke, the stroke between two working ones being a cooling stroke for the press-tools.

What I claim is:

1. In a press for the forging of deep cup-shaped bodies from a solid blank, in combination, a relatively stationary matrix having throughout the major portion of its axial extent a cavity of the conformation of the outside surface of a body to be formed therein and a rearward extension of said cavity of a cross section corresponding to the cross section of a blank for said body, a reciprocating die fitting said extension, a second reciprocating die fitting the upper end of said cavity, a mandrel conforming to the inside of said finished body, slidable in said second die and reciprocating in unison therewith during part of its stroke and individual means to reciprocate said dies and said mandrel into and out of the respective portion of said matrix.

2. In a press for the forging of deep cup-shaped bodies from a solid blank, in combination, a relatively stationary matrix having throughout the major portion of its axial extent a cavity of the conformation of the outside surface of a body to be formed therein, a rearward extension of said cavity of a cross section corresponding to the cross section of a blank for said body, a reciprocating die fitting said extension, a second reciprocating die fitting the upper end of said cavity, a mandrel conforming to the inside of said finished body, and slidable in said second mentioned die and reciprocating in unison therewith during part of its stroke, a main driving shaft, a crank on said shaft adapted to reciprocate said second die, a cam on said shaft adapted to reciprocate said mandrel, a toggle adapted to reciprocate said first mentioned die, and power transmitting elements between said main driving shaft and said toggle.

3. In a press for the forging of deep cup-shaped bodies from a solid blank, in combination, a rotatable matrix holder, a plurality of like matrices arranged symmetrically around and parallel with the axis of said holder, said matrices each having throughout the major portion of their axial extent a cavity of the conformation of the outside surface of a body to be formed therein and a rearward extension of said cavity of a cross section corresponding to the cross section of a blank for said body, a reciprocating die fitting said extension, a second reciprocating die fitting the upper end of said cavity, a mandrel conforming to the inside of said finished body, and slidable in said second die and reciprocating in unison therewith during part of its stroke and individual means to reciprocate said dies and said mandrel into and out of the respective portion of one of said matrices and means to rotate said holder to present a different matrix to said dies and said mandrel on succeeding operating cycles thereof.

4. In a press for the forging of deep cup-shaped bodies from a solid blank, in combination, a rotatable matrix holder, a plurality of like matrices arranged symmetrically around and parallel with the axis of said holder, said matrices each having throughout the major portion of their axial extent a cavity of the conformation of the outside surface of the body to be formed therein and a rearward extension of said cavity of a cross section corresponding to the cross section of a blank for said body, a reciprocating die fitting said extension, a second reciprocating die fitting the upper end of said cavity, a mandrel conforming to the inside of said finished body, slidable in said second mentioned die and reciprocating in unison therewith during part of its stroke, a main driving shaft, a crank on said shaft adapted to reciprocate said second die, a cam on said shaft adapted to reciprocate said mandrel, a toggle adapted to reciprocate said first mentioned die, gearing connecting said main shaft and said toggle, and a Geneva gearing driven from said main shaft and adapted to cyclically rotate said matrix holder between succeeding operating cycles to present a different matrix to said dies and to said mandrel during succeeding operating cycles.

5. In a press for the forging of deep cup-shaped bodies from a solid blank, in combination, a relatively stationary matrix having throughout the major portion of its axial extent a cavity of the conformation of the outside surface of a body to be formed therein and a rearward extension of said cavity of a cross section corresponding to the cross section of a blank for said body, a reciprocating die fitting said extension, a second reciprocating die fitting the upper end of said cavity, a mandrel conforming to the inside of said finished body, and slidable in said second mentioned die and reciprocating in unison therewith during part of its stroke, a main shaft for operating said press and means driven by said shaft to cyclically first move said dies and said mandrel in unison into the matrix with the face of the mandrel flush with the face of said second die, thereafter moving said mandrel further into the matrix while holding the first mentioned die stationary and retracting the second die, and finally withdrawing the first mentioned die and said mandrel.

6. In a press for the forging of deep cup-shaped bodies from a solid blank, in combination, a rotatable matrix holder, a working matrix mounted eccentric to and parallel with the axis of said holder, said matrix having throughout the major portion of its axial extent a cavity of the conformity of the outside surface of a body to be formed therein and a rearward extension of said cavity of a cross section corresponding to the cross section of a blank for said body, a cooling matrix of a conformation similar to the inside conformation of said working matrix, mounted on said holder symmetrical with said working matrix and provided with heat exchange means for effective cooling thereof, a reciprocating die fitting said extension, a second reciprocating die fitting the upper end of said cavity, a mandrel conforming to the inside of said finished body, and slidable in said second die and reciprocating in unison therewith during part of its stroke and individual means to reciprocate said dies and said mandrel into and out of respective portions of one of said matrices, means to rotate said holder to present said working matrix to said dies and said mandrel to form a body and alternately to present said cooling matrix to cool said dies and said mandrel by heat exchange therebetween.

7. In a press for the forging of deep cup-shaped articles from a solid blank, in combination, a rotatable matrix holder, a plurality of similar working matrices arranged parallel with the axis of said holder and uniformly spaced in a circle concentric with said axis, said matrices each having throughout the major portion of their axial extent a cavity of the conformation of the outside surface of a body to be formed therein and a rearward extension of said cavity of a cross-section corresponding to the cross-section of the blank for said body, a plurality of similar cooling matrices of a conformation similar to the inside conformation of said working matrices and arranged on said holder symmetrical to and alternately with said working matrices and provided with heat exchange means for effective cooling thereof, a reciprocating die fitting said extension, a second reciprocating die fitting the upper end of said cavity, a mandrel conforming to the inside of said finished body, slidable in said second die and reciprocating in unison therewith during part of its stroke, and individual means to reciprocate said dies and said mandrel into and out of respective portions of one of said matrices, means to rotate said holder to present a working matrix to said dies and said mandrel to form a body and alternately to present a cooling matrix to cool said dies and said mandrel by heat exchange therebetween.

8. In a forging press for forging cup-shaped articles, in combination, a matrix having a cavity of the conformation of the outside surface of a body to be formed therein, a die forming the bottom of said cavity and slidingly fitting the bottom end thereof, a second reciprocating die fitting the upper end of said cavity, a mandrel conforming to the inside of said finished body and slidably fitting a central opening in said second die and individual means to first move said first die, said second die and said mandrel into said cavity to compress a blank located therein, thereafter to withdraw said second die, while continuing the inward movement of said mandrel and finally to withdraw said mandrel and said first die.

9. The shell making process described herein, comprising, inserting a plastic cylindrical slug into a forging template, completely confining it therein, compressing said slug by applying pressure to it at opposite ends and thereby forcing its perimetric surface into contact with said matrix, thereafter applying pressure to the central area of one end of said slug by a movable plunger and thereby extrude said slug into the space between said plunger and said template, and removing the resultant shell from said template.

FRITZ B. HATEBUR.